United States Patent
Mustonen et al.

(10) Patent No.: US 12,421,083 B2
(45) Date of Patent: Sep. 23, 2025

(54) METHOD AND A DOOR DRIVE UNIT FOR DEFINING TENSION OF A BELT OF AN AUTOMATIC DOOR

(71) Applicant: Kone Corporation, Helsinki (FI)

(72) Inventors: Matti Mustonen, Helsinki (FI); Markku Jokinen, Helsinki (FI)

(73) Assignee: Kone Corporation, Helsinki (FI)

( * ) Notice: Subject to any disclaimer, the term of this patent is extended or adjusted under 35 U.S.C. 154(b) by 274 days.

(21) Appl. No.: 17/962,874

(22) Filed: Oct. 10, 2022

(65) Prior Publication Data

US 2023/0035649 A1 Feb. 2, 2023

Related U.S. Application Data

(63) Continuation of application No. PCT/FI2020/050332, filed on May 19, 2020.

(51) Int. Cl.
| | |
|---|---|
| *B66B 13/14* | (2006.01) |
| *G01L 5/06* | (2006.01) |
| *G01M 13/028* | (2019.01) |

(52) U.S. Cl.
CPC .............. *B66B 13/143* (2013.01); *G01L 5/06* (2013.01); *G01M 13/028* (2013.01)

(58) Field of Classification Search
CPC ..... B66B 13/143; B66B 13/00; B66B 5/0018; B66B 5/0037; B66B 5/12; B66B 5/14; B66B 13/02; G01L 5/06; G01L 1/10; G01L 1/183; G01L 5/04; G01L 5/042; G01L 5/10; G01L 5/045; G01L 5/047; G01M 13/028;

(Continued)

(56) References Cited

U.S. PATENT DOCUMENTS

| | | | | |
|---|---|---|---|---|
| 4,636,700 A | * | 1/1987 | Moore ................ | G05D 3/1409 318/621 |
| 5,698,796 A | * | 12/1997 | Hirano ................ | G01L 5/042 73/160 |

(Continued)

FOREIGN PATENT DOCUMENTS

| | | | | |
|---|---|---|---|---|
| CN | 108715386 A | | 10/2018 | |
| GB | 2625538 A | * | 6/2024 | .......... B65G 1/0464 |

(Continued)

OTHER PUBLICATIONS

English machine translation of JP 2003004560 (Yonetani) (Year: 2003).*

(Continued)

*Primary Examiner* — Alvaro E Fortich
*Assistant Examiner* — Martin Walter Braunlich
(74) *Attorney, Agent, or Firm* — Harness, Dickey & Pierce, P.L.C.

(57) ABSTRACT

A method for defining a tension of a belt of an automatic door includes exciting a resonant frequency of the belt to cause a vibration of the belt, obtaining motion data representing motion of an electric motor that moves the belt, defining vibration information representing the vibration of the belt based on the obtained motion data, and defining the tension of the belt based on the defined vibration in-formation and predefined characteristics of the belt. The method may be performed by a door drive unit and a computer program for defining a tension of a belt of an automatic door.

15 Claims, 2 Drawing Sheets

(58) Field of Classification Search
CPC ............. G01M 5/0066; G01M 5/0041; G01M 5/0075; G01M 7/00
See application file for complete search history.

(56) References Cited

U.S. PATENT DOCUMENTS

| | | | | |
|---|---|---|---|---|
| 10,488,282 B2* | 11/2019 | Guru | ........................ | H02P 6/10 |
| 11,105,401 B2* | 8/2021 | Chinnel | .................... | G01L 5/04 |
| 11,536,741 B2* | 12/2022 | Andler | ...................... | G01P 3/60 |
| 11,828,665 B2* | 11/2023 | Sekiguchi | ................ | F16H 7/02 |

FOREIGN PATENT DOCUMENTS

| | | | |
|---|---|---|---|
| JP | 2003004560 A | * | 1/2003 |
| WO | WO-2014199688 A1 | | 12/2014 |
| WO | WO-2015159597 A1 | | 10/2015 |

OTHER PUBLICATIONS

Karaoglu, B. (2020). Waves. In: Classical Physics. Springer, Cham. https://doi.org/10.1007/978-3-030-38456-2_10 (Year: 2020).*
Extended European Search Report dated Dec. 19, 2023 issued in corresponding European Application No. 20936133.6.
International Search Report for International Application No. PCT/FI2020/050332 dated Oct. 12, 2020.
Written Opinion of the International Searching Authority for International Application No. PCT/FI2020/050332 dated Oct. 12, 2020.

* cited by examiner

METHOD AND A DOOR DRIVE UNIT FOR DEFINING TENSION OF A BELT OF AN AUTOMATIC DOOR

CROSS-REFERENCE TO RELATED APPLICATION

This application is a continuation of PCT International Application No. PCT/FI2020/050332 which has an International filing date of May 19, 2020, the entire contents of which are incorporated herein by reference.

TECHNICAL FIELD

The invention concerns in general the technical field of automatic doors. Especially the invention concerns belts of the automatic doors.

BACKGROUND

Typically, in automatic doors, e.g. elevator doors, a door drive, i.e. a frequency converter, is used to control an electric motor of the automatic door. The electronic motor moves a door panel(s) of the automatic door with a belt that converts a rotational motion generated by the electric motor into a linear motion.

Typically, the automatic door comes pre-installed from a factory and a tension of the belt is assumed to be within a correct range as it has been measured at the factory. Nevertheless, the belt may still be too tight or loose. Furthermore, typically when the belt is replaced and/or adjusted, the belt may be too tight or loose. Too tight belt may cause smaller operating margin (what torque the electrical motor may produce versus what is a static counter torque/friction) and increased call-out risk when other frictions, e.g. roller bearings, slide guide shoes, etc., increase. Also, it may cause that too much energy will be used, which, in turn, reduces eco-efficiency of the automatic door and the whole elevator, if the automatic door is an elevator door. Too loose belt, in turn, may cause a functional failure as the belt slips over teeth of a belt driving pulley. In addition, the belt material may change over the time resulting typically to harder and thus more rigid belt causing higher tensions.

The belt tension may be measured with a dedicated sonic belt tension meter, which measures the vibration of the belt and based on that the tension of the belt may be defined. However, this requires that at least one field person, e.g. a maintenance person or a technician, goes to the site, i.e. to the automatic door, some work to get an access to the belt by the field person, and manually strumming of the belt by the field person to measure the vibration of the belt. Furthermore, the technician may check the belt tension manually after adjustment or replacement Thus, there is need to develop further solutions in order to improve a definition of a tension of a belt of an automatic door.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method and a door drive unit for defining tension of a belt of an automatic door. Another objective of the invention is that the method and the door drive unit for defining tension of a belt of an automatic door enables a simple way to define the tension of the belt.

The objectives of the invention are reached by a method, a door drive unit, a computer program, and a computer-readable medium as defined by the respective independent claims.

According to a first aspect, a method for defining a tension of a belt of an automatic door is provided, wherein the method comprising: exciting a resonant frequency of the belt to cause a vibration of the belt, obtaining motion data representing motion of an electric motor configured to move the belt, defining vibration information representing the vibration of the belt based on the obtained motion data, and defining the tension of the belt based on the defined vibration information and predefined characteristics of the belt.

The vibration information representing the vibration of the belt may be a vibration frequency of the belt.

The predefined characteristics of the belt may comprise at least one of a vibrating span length of the belt, mass per unit length and width of the belt, and width of the belt.

The exciting the resonant frequency of the belt may comprise controlling the electric motor according to a position reference of the electric motor, a speed reference of the electric motor, or a torque reference of the electric motor added with a signal comprising a plurality of frequencies including the resonant frequency of the belt.

The signal may be a pseudo-random-binary signal.

The motion data may be position, speed, acceleration, or jerk.

The vibration of the belt may be longitudinal, transversal, or torsional.

According to a second aspect, a door drive unit for defining a tension of a belt of an automatic door is provided, wherein the door drive unit comprises a control unit comprising: at least one processor, and at least one memory storing at least one portion of computer program code, wherein the at least one processor being configured to cause the control unit at least to perform: excite a resonant frequency of the belt to cause a vibration of the belt, obtain motion data representing motion of an electric motor configured to move the belt, define vibration information representing a vibration of the belt based on the obtained motion data, and define the tension of the belt based on the defined vibration information and predefined characteristics of the belt.

The vibration information representing the vibration of the belt may comprise a vibration frequency.

The predefined characteristics of the belt may comprise at least one of a vibrating span length of the belt, mass per unit length and width of the belt, and width of the belt.

The control unit may be configured to control the electric motor according to a position reference of the electric motor, a speed reference of the electric motor, or a torque reference of the electric motor added with a signal comprising a plurality of frequencies including the resonant frequency of the belt to excite the resonant frequency of the belt.

The signal may be a pseudo-random-binary signal.

The motion data may be position, speed, acceleration of the electric motor, or jerk.

The vibration of the belt may be longitudinal, transversal, or torsional.

The motion data may be obtained from a rotation angle sensor.

According to a third aspect, a computer program is provided, wherein the computer program comprises instructions which, when executed by a control unit of a door drive unit as described above, cause the control unit to perform the method as described above.

According to a fourth aspect a computer-readable medium having stored thereon the computer program as described above is provided.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
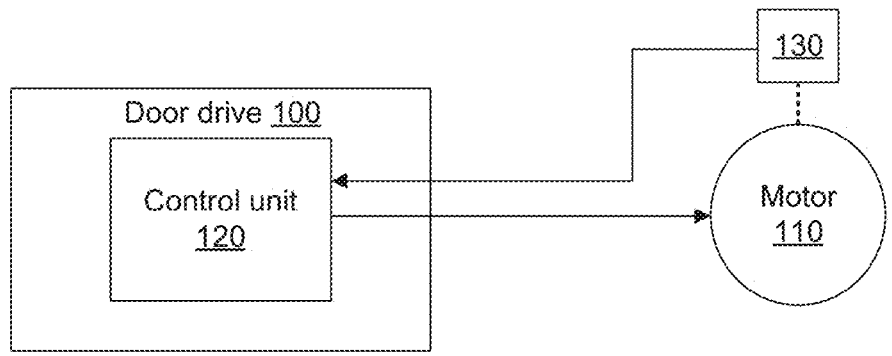
FIG. 1A illustrates schematically an example of a door drive unit of an automatic door according to the invention.

FIG. 1A illustrates schematically an example of a door drive unit 100 of an automatic door according to the invention. The door drive unit 100 is a frequency converter configured to control a motion an electric motor 110 of the automatic door. The electronic motor 110 moves a door panel(s) of the automatic door with a belt 140 that converts a rotational motion generated by the electric motor 110 into a linear motion. The electric motor 110 may be e.g. a permanent magnet synchronous motor. The automatic door may be an elevator door or a building door. The door drive unit 100 comprises a control unit 120 configured to control the motion of the electric motor 110 according to a speed reference of the electric motor 110, a torque reference of the electric motor 110, and/or a position reference of the electric motor 110. The speed reference represents the speed of the electric motor 110 as a function of time. The torque reference represents the torque of the electric motor 110 as a function of time. The position reference represents the position of the electric motor 110 as a function of time. The door drive unit 100 may further comprise one or more other entities, e.g. an internal speed controller.

Figure 1B:
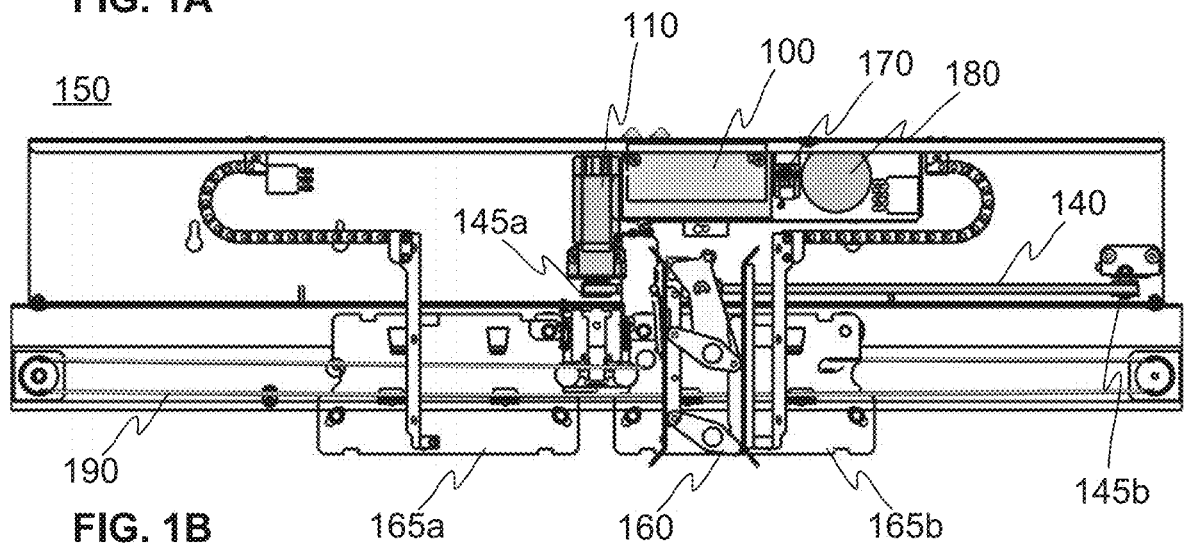
FIG. 1B illustrates schematically a non-limiting example of a door operator for opening and closing an automatic door.

FIG. 1B illustrates schematically a non-limiting example of a door operator 150 for opening and closing the automatic door. The door operator 150 may comprise e.g. the electric motor 110, the door drive unit 100, the belt 140, belt driving pulleys 145a, 145b, a door coupler 160, and hanger plates 165a, 165b of the door panels of the automatic door. For sake of clarity the door panels are not show in FIG. 1B. The door operator 150 may comprise alternatively or in addition one or more other entities, e.g. power supply connections 170, a transformer 180, a synchronization rope 190, etc. In the example of FIG. 1B the automatic door is an elevator door comprising a landing door and a car door. The landing door may be opened by opening movement of the car door and closed by the closing movement of the car door by using the door coupler 160 attached to the car door.

Figure 2:
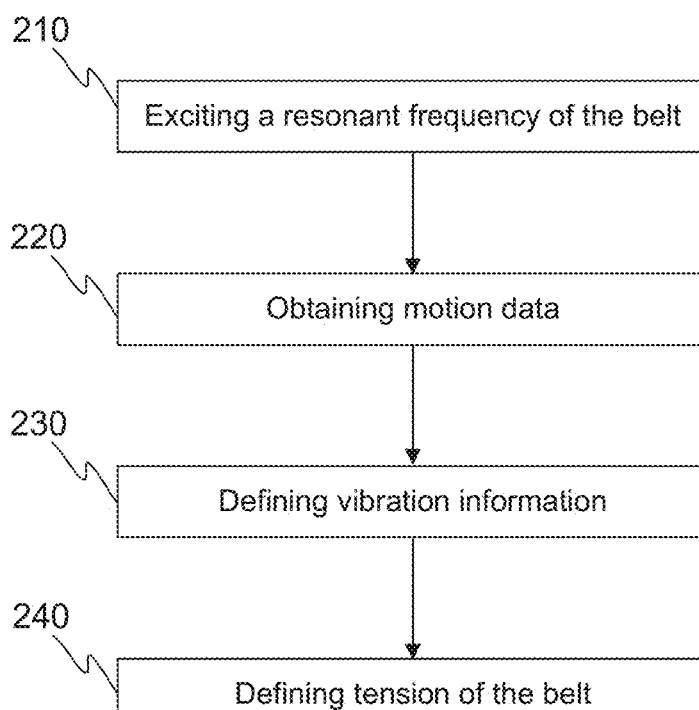
FIG. 2 illustrates schematically an example of a method according to the invention.

Next an example of a method for defining a tension of a belt 140 of an automatic door according to the invention is described by referring to FIG. 2, which illustrates schematically the invention as a flow chart.

Figure 3:
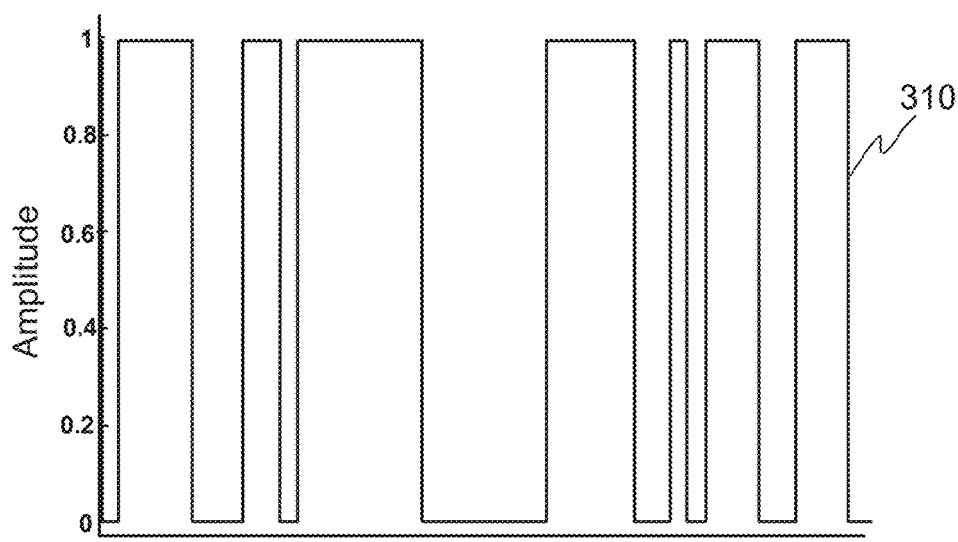
FIG. 3 illustrates schematically a non-limiting example of a waveform of a pseudo-random-binary signal.

At a step 210 the control unit 120 excites a resonant frequency of the belt 140 to cause a vibration of the belt 140. The vibration of the belt 140 may be longitudinal, transversal, torsional, or any other waveform. The exciting of the resonant frequency of the belt 140 may comprise controlling the electric motor 110 according to a motion reference of the electric motor 110 added with a signal comprising a plurality of frequencies including the resonant frequency of the belt 140. The motion reference of the electric motor 110 may be a position reference of the electric motor 110, a speed reference of the electric motor 110, or a torque reference of the electric motor 110. The signal may be a pseudorandom-binary signal (PRBS). The PRBS is a periodic deterministic signal having properties similar to white noise. The white noise is a random signal having equal intensity at different frequencies. FIG. 3 illustrates schematically a non-limiting example of a waveform of the PRBS 310 as a function of time. The amplitude of the signal may be defined based on a normal motion reference of the electric motor 110, i.e. a motion reference of the electric motor 110 without the added signal.

At a step 220 the control unit 120 obtains motion data representing the motion of the electric motor 110 with respect to time, i.e. as a function of time. The motion data, i.e. motion signal, may be position, i.e. angular position, speed, acceleration, or jerk, of the electric motor 110. The jerk of the electric motor 110 means a rate at which acceleration of the electric motor 110 changes with respect to time. The motion data may be obtained from a rotation angle sensor 130, e.g. an encoder mounted to the electric motor 110, communicatively coupled to the door drive unit 100.

Figure 4:
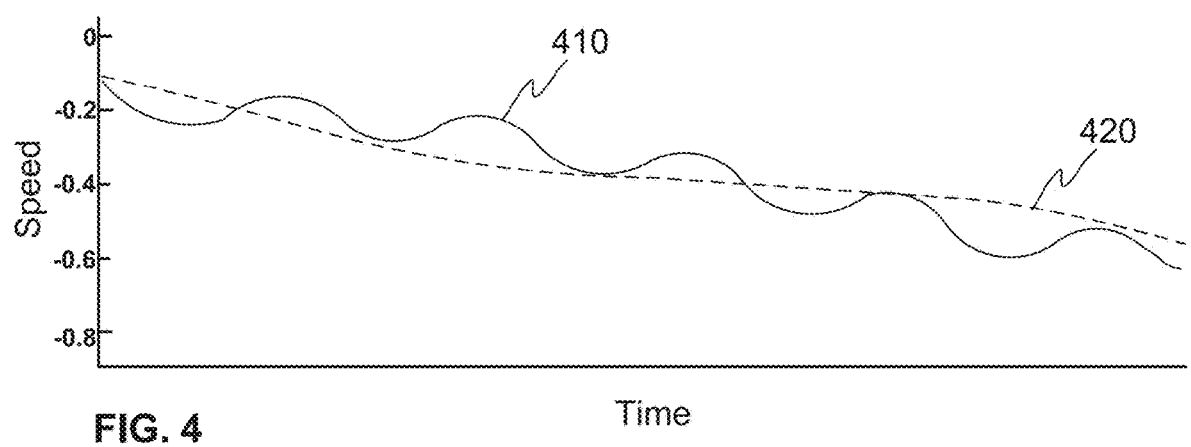
FIG. 4 illustrates schematically a non-limiting example of obtained motion data of an electric motor according to the invention.

At a step 230 the control unit 120 defines vibration information representing the vibration of the belt 140 based on the obtained motion data. In other words, the vibration of the belt 140 may be detected from the obtained motion data of the electric motor 110. FIG. 4 illustrates schematically a non-limiting example of obtained motion data of the electric motor 110. In FIG. 4 the obtained motion data is the speed of the electric motor 110 as a function of time and is illustrated with the solid line 410. The motion of the electric motor 110 is controlled according to the speed reference of the electric motor 110 added with the signal comprising a plurality of frequencies including the resonant frequency of the belt 140 as discussed above. The vibration of the belt 140 may be seen as a wave motion of the obtained speed of the electric motor 110 illustrated with the solid line 410. In FIG. 4 also a reference speed of the electric motor 110, when the motion of the electric motor 110 is controlled according to the speed reference of the electric motor 110 without the added signal, is illustrated for a comparison. The reference speed of the electric motor 110 is illustrated with a dashed line 420. The vibration information representing the vibration of the belt 140 may be a vibration frequency of the belt 140, i.e. resonance frequency of the belt 140. According to an example, the control unit 120 may be configured to define the vibration frequency of the belt 140 with a Fourier analysis, e.g. Fast Fourier transform (FFT), to convert the obtained motion data, i.e. motion signal, from time domain into a frequency domain.

At a step 240 the control unit 120 defines the tension of the belt 140 based on the defined vibration information and predefined characteristics of the belt 140. The predefined characteristics of the belt 140 may comprise at least one of a vibrating span length of the belt 140, mass per unit length and width of the belt 140, and width of the belt 140. According to an example of the invention the tension of the belt 140 may be defined by using the following formula:

$$T_{st} = 4f^2 L^2 m \times d, \qquad (1)$$

wherein $T_{st}$ is the tension of the belt, i.e. a static tension of the belt [N], f is the vibration frequency of the belt [Hz], L is the vibrating span length of the belt [m], m is the mass per unit length and width of the belt [kg/m$^2$], and d is the width of the belt [m].

The above discussed method for defining the tension of the belt 140 of the automatic door may be performed in a regular interval (e.g. once a week, every two weeks, etc.) and preferably not during a normal operation of the automatic door as the excitation may cause abnormal noise.

Figure 5:
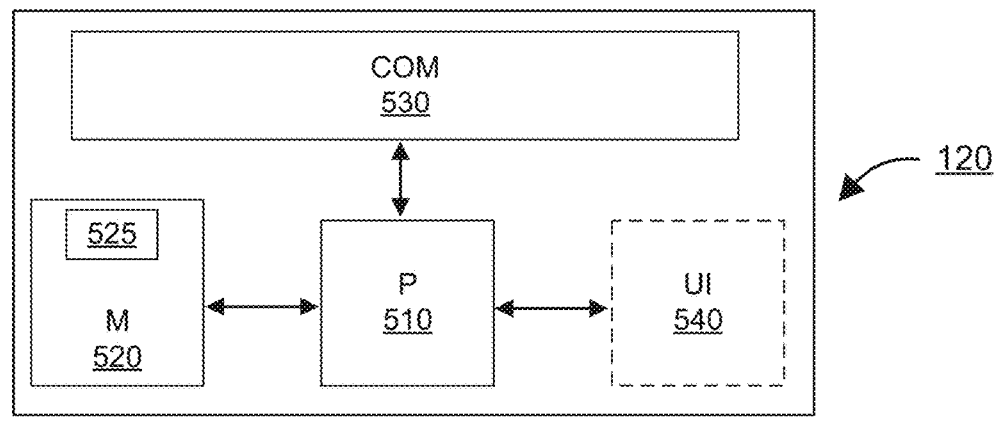
FIG. 5 illustrates schematically an example of components of a control unit of a door drive unit according to the invention.

FIG. 5 illustrates schematically an example of components of the control unit 120 of the door drive unit 100 according to the invention. Preferably, the control unit 120 may be comprised in or as a part of the door drive unit 100 as illustrated in FIG. 1. Alternatively, the control unit 120 may be a separate unit from the door drive unit 100. The control unit 120 may comprise one or more processors 510, one or more memories 520 being volatile or non-volatile for storing portions of computer program code 525 and any data values, one or more communication interface units 530 and possibly one or more user interface units 540. The mentioned elements may be communicatively coupled to each other with e.g. an internal bus. The at least one processor may be configured to execute at least some portion of a computer program code 525 stored in the at least one memory 520 causing the at least one processor 510, and thus the control unit 120, to perform at least the method steps described above. The at least one processor 510 may thus be arranged to access the memory 520 and retrieve and store any information therefrom and thereto. For sake of clarity, the processor herein refers to any unit suitable for processing information and control the operation of the drive control unit, among other tasks. The operations may also be implemented with a microcontroller solution with embedded software. Similarly, the memory 520 is not limited to a certain type of memory only, but any memory type suitable for storing the described pieces of information may be applied in the context of the present invention. The communication interface unit 530 provides an interface for communication with any external unit, e.g. the electric motor 110, and the rotation angle sensor 130. The communication interface unit 530 may be based on one or more known communication technologies, either wired or wireless, in order to exchange pieces of information. The one or more user interface units 540 may comprise one or more input/output (I/O) devices.

The control unit 120 is configured to excite a resonant frequency of the belt 140 to cause a vibration of the belt 140. The vibration of the belt 140 may be longitudinal, transversal, torsional, or any other waveform. The control unit 120 may be configured to control the electric motor 110 according to a motion reference of the electric motor 110 added with a signal comprising a plurality of frequencies including the resonant frequency of the belt 140 to excite the resonant frequency of the belt 140. The motion reference of the electric motor 110 may be a position reference of the electric motor 110, a speed reference of the electric motor 110, or a torque reference of the electric motor 110. The signal may be a pseudo-random-binary signal (PRBS) as discussed above. The amplitude of the signal may be defined based on a normal motion reference of the electric motor 110, i.e. a motion reference of the electric motor 110 without the added signal.

The control unit 120 is further configured to obtain motion data representing the motion of the electric motor 110 with respect to time, i.e. as a function of time. The motion data, i.e. a motion signal, may be position, i.e. angular position, speed, acceleration, or jerk, of the electric motor 110. The jerk of the electric motor 110 means a rate at which acceleration of the electric motor 110 changes with respect to time. The motion data may be obtained from the rotation angle sensor communicatively coupled to the door drive unit 100.

The control unit 120 is further configured to define vibration information representing the vibration of the belt 140 based on the obtained motion data. In other words, the vibration of the belt 140 may be detected from the obtained motion data of the electric motor 110. The vibration information representing the vibration of the belt 140 may be a vibration frequency of the belt 140, i.e. resonance frequency of the belt 140. According to an example, the control unit 120 may be configured to define the vibration frequency of the belt 140 with a Fourier analysis, e.g. FFT, to convert the obtained motion data, i.e. motion signal, from time domain into a frequency domain.

The control unit 120 is further configured to define the tension of the belt 140 based on the defined vibration information and predefined characteristics of the belt 140. The predefined characteristics of the belt 140 may comprise at least one of a vibrating span length of the belt 140, mass per unit length and width of the belt 140, and width of the belt 140. According to an example of the invention the tension of the belt 140 may be defined by using the above presented formula (1).

The door drive unit 100 and the method according to the present invention described above enables defining the tension of the belt 140 of the automatic door without a need to visit the site, i.e. the automatic door, by a field person, e.g. a maintenance person or a technician, and manually measuring the tension. Moreover, the present invention does not require any additional hardware or measurements, because the definition of the tension of the belt 140 of the automatic door may be performed with the door drive unit, i.e. the frequency converter, 100 that is an existing entity of a door operator of the automatic door used to control the electric motor 110 to move the door panel(s) of the automatic door with the belt 140. Moreover, the present invention enables that the loosening of the belt 140 may be detected even before any indication of the loosening appears and/or any call-outs occurs, which in turn enables a preventive maintenance of the belt 140. The present invention also enables detection of an increase of the tension of the belt 140 caused by a change in the belt 140 material over the time, typically to harder and thus more rigid belt 140, which also enables the preventive maintenance of the belt 140. Furthermore, the present invention enables inspecting that the tension of the belt 140 is within a predefined range, i.e. not too tight or too loose, after installation of the automatic door, replacement of the belt 140, and/or adjustment of the belt 140.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for defining a tension of a belt of an automatic door by a control unit of a door drive unit, the method comprising the control unit:

exciting a resonant frequency of the belt to cause a vibration of the belt;

obtaining motion data representing motion of an electric motor configured to move the belt;

defining vibration information representing the vibration of the belt based on the obtained motion data; and defining the tension of the belt based on the defined vibration information and predefined characteristics of the belt, wherein the exciting the resonant frequency of the belt comprises providing a drive signal to the electric motor to control the electric motor to move the belt according to a position reference of the electric motor, a speed reference of the electric motor, or a torque reference of the electric motor, with a pseudo-random-binary signal comprising a plurality of frequencies including the resonant frequency of the belt added to the drive signal.

2. The method according to claim 1, wherein the vibration information representing the vibration of the belt is a vibration frequency of the belt.

3. The method according to claim 1, wherein the predefined characteristics of the belt comprise at least one of a vibrating span length of the belt, mass per unit length and width of the belt, and the width of the belt.

4. The method according to claim 1, wherein the motion data is position, speed, acceleration, or jerk.

5. The method according to claim 1, wherein the vibration of the belt is longitudinal, transversal, or torsional.

6. A door drive unit for defining a tension of a belt of an automatic door, the door drive unit including a control unit comprising:

at least one processor; and at least one memory storing at least one portion of computer program code, wherein the at least one processor being configured, based on the at least one portion of computer program code, to cause the control unit to excite a resonant frequency of the belt to cause a vibration of the belt, obtain motion data representing motion of an electric motor configured to move the belt, define vibration information representing the vibration of the belt based on the obtained motion data, and define the tension of the belt based on the defined vibration information and predefined characteristics of the belt, wherein the control unit is configured to excite the resonant frequency of the belt by providing a drive signal to the electric motor to control the electric motor to move the belt according to a position reference of the electric motor, a speed reference of the electric motor, or a torque reference of the electric motor, with a pseudo-random-binary signal comprising a plurality of frequencies including the resonant frequency of the belt added to the drive signal.

7. The door drive unit according to claim 6, wherein the vibration information representing the vibration of the belt comprises a vibration frequency.

8. The door drive unit according to claim 6, wherein the predefined characteristics of the belt comprises at least one of a vibrating span length of the belt, mass per unit length and width of the belt, and the width of the belt.

9. The door drive unit according to claim 6, wherein the motion data is position, speed, acceleration of the electric motor, or jerk.

10. The door drive unit according to claim 6, wherein the vibration of the belt is longitudinal, transversal, or torsional.

11. The door drive unit according to claim 6, wherein the motion data is obtained from a rotation angle sensor.

12. A non-transitory computer-readable medium that stores a computer program comprising instructions which, when executed by the control unit of the door drive unit, cause the control unit to perform the method according to claim 1.

13. The door drive unit according to claim 6, wherein the at least one memory comprises a non-transitory computer-readable medium storing the at least one portion of computer program code.

14. The method according to claim 1, wherein the tension of the belt is defined as $$T_{st}=4f^2L^2m\times d,$$

wherein $T_{st}$ is a static tension of the belt, f is a vibration frequency of the belt, L is a vibrating span length of the belt, m is mass per unit length and width of the belt, and d is the width of the belt.

15. The door drive unit according to claim 6, wherein the control unit is configured to define the tension of the belt as $$T_{st}=4f^2L^2m\times d,$$

wherein $T_{st}$ is a static tension of the belt, f is a vibration frequency of the belt, L is a vibrating span length of the belt, m is mass per unit length and width of the belt, and d is the width of the belt.

* * * * *